United States Patent [19]
Zinke, II

[11] Patent Number: 5,425,347
[45] Date of Patent: Jun. 20, 1995

[54] CONNECTOR FOR EXHAUST GAS RECIRCULATION TUBE

[75] Inventor: James R. Zinke, II, Sterling Heights, Mich.

[73] Assignee: Bundy Corporation, Warren, Mich.

[21] Appl. No.: 210,476

[22] Filed: Mar. 21, 1994

[51] Int. Cl.$^6$ .................. F02M 25/07; F16L 57/00; F16L 23/00

[52] U.S. Cl. .................. 123/568; 285/49; 285/330; 285/414

[58] Field of Search .............. 123/568, 569, 570, 571; 285/39, 49, 158, 205, 330, 242, 256, 257, 414, 918

[56] References Cited

U.S. PATENT DOCUMENTS

| | | | |
|---|---|---|---|
| 4,960,096 | 10/1990 | Sukimoto et al. | 123/568 |
| 5,158,061 | 10/1992 | Monteith | 123/568 |
| 5,174,612 | 12/1992 | Schnell | 285/49 |
| 5,201,549 | 4/1993 | Davey | 285/39 |
| 5,203,313 | 4/1993 | Rotarius | 123/571 |
| 5,333,917 | 8/1994 | Davey et al. | 285/205 |

*Primary Examiner*—Willis R. Wolfe
*Attorney, Agent, or Firm*—Dorn, McEachran, Jambor & Keating

[57] ABSTRACT

A connector for attaching an exhaust gas recirculation tube to an intake manifold of an internal combustion engine. A thermal isolator surrounds an end of the tube and includes a sleeve contacting the tube and merging with a cylindrical body portion which is spaced from the tube. An upset bead is formed in the body portion. The tube and thermal isolator are inserted into a flange surrounding an opening formed in the intake manifold. A retainer is inserted into the flange and rotated such that latching devices on the retainer engage hooks on the flange to prevent removal of the retainer from the flange. The retainer also has ribs for supporting the body portion of the thermal isolator. The retainer is sized to engage the bead of the thermal isolator to prevent removal of the thermal isolator and tube from the flange. The flange and thermal isolator are sealed against fluid leakage.

10 Claims, 1 Drawing Sheet

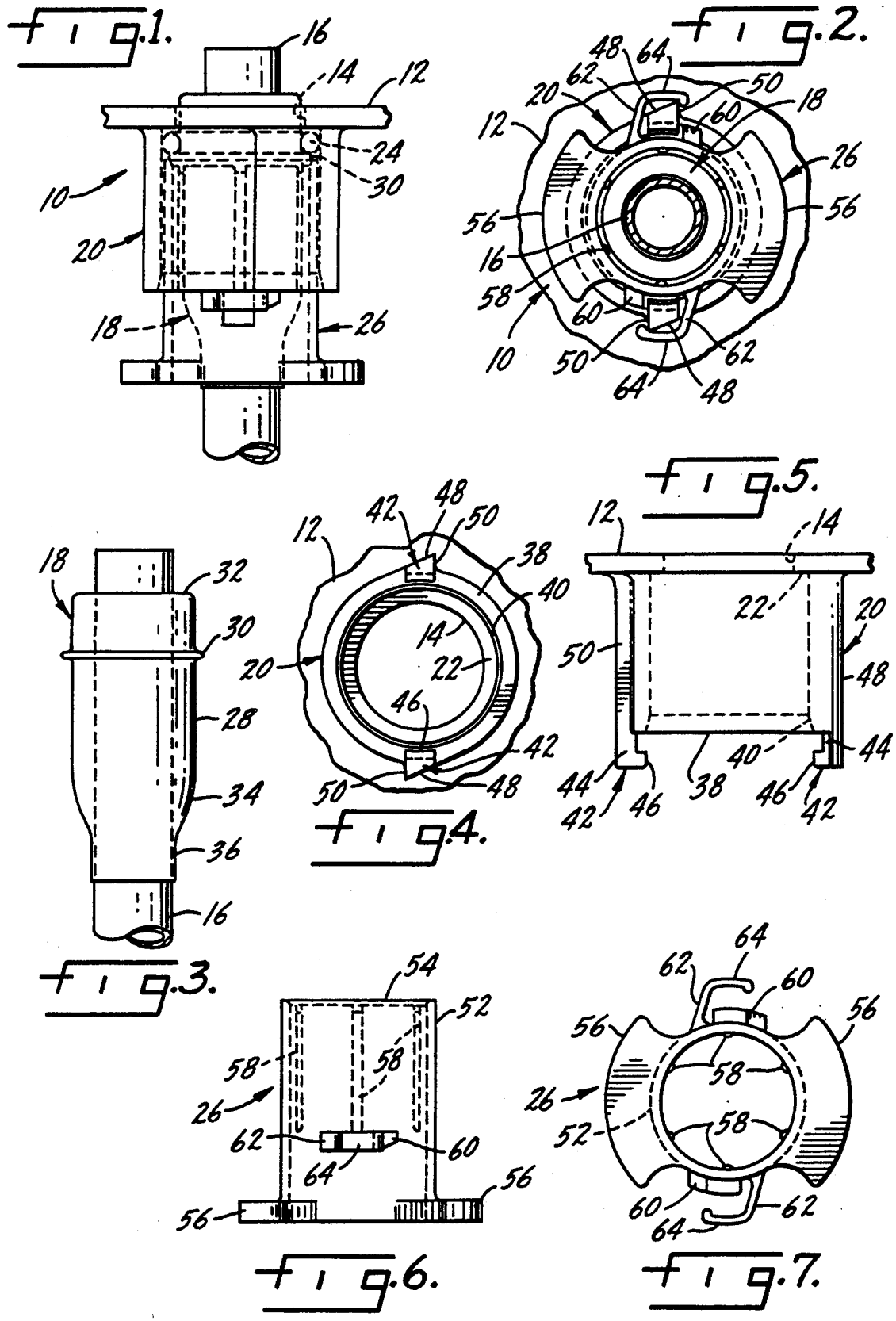

CONNECTOR FOR EXHAUST GAS RECIRCULATION TUBE

BACKGROUND OF THE INVENTION

This invention relates to a quick connect fitting for the exhaust gas recirculation (EGR) tube of an internal combustion engine.

For many years now emission controls for internal combustion engines have included an exhaust gas recirculation system. The purpose of this system is to inhibit the formation of oxides of nitrogen, $NO_x$, that are produced at the high temperatures and pressures occurring during combustion. To reduce the high temperatures of combustion, and thus the $NO_x$ emissions, some of the relatively inert exhaust gasses are routed back into the intake mixture of fuel and air. The EGR system includes an EGR valve which regulates the amount of exhaust gasses introduced to the air/fuel mixture. Sometimes this valve has been threaded into a passage formed in the intake manifold.

Recently, engine manufacturers have produced intake manifolds made of polymeric material for the purpose of saving weight and cost. Due to the high temperatures of the exhaust gasses, it is unreasonable to install the EGR valve directly in the intake manifold. Instead, a typical EGR system for an engine with a polymeric intake manifold includes a "hot side" EGR tube running from the exhaust manifold to the EGR valve, and a "cold side" EGR tube running from the EGR valve to the intake manifold. The hot side tube is attached to the exhaust manifold and EGR valve with a threaded fitting utilizing a metal-to-metal flange seal due to the extreme temperatures encountered. The cold side tube is also attached to the EGR valve with a threaded fastener. At the intake manifold the connection needs to insulate the polymeric intake manifold from the EGR tube. The temperatures at this end are in the range that will not permit long-term contact between the manifold and the EGR tube. Nevertheless, it is possible to use a plastic fitting along with an elastomeric seal to make the connection. Therefore, there is an opportunity to utilize a quick connect configuration.

Prior art connectors of the type described suffer from requiring a multiplicity of parts, some of which necessitate complex molding with intricate small components which are subject to failure.

SUMMARY OF THE INVENTION

This invention concerns a connector for attaching and sealing a cold side EGR tube to a polymeric intake manifold. The connector uses a minimum number of components and will withstand the thermal, vibration and chemical environment in the vicinity of the connection.

The connection includes a metallic thermal isolator that surrounds the end of the EGR tube at the intake manifold. The isolator has a cylindrical body concentric with the tube and spaced therefrom. An upset bead is formed in the body. An O-ring seal surrounds the body and lies adjacent the bead. The body merges at one end with a necked-down portion connecting to a sleeve portion that contacts the EGR tube remote from the tip of the tube. The sleeve is welded or brazed to the tube.

An Opening in the intake manifold wall is surrounded by an annular flange. The inside diameter of the flange is somewhat larger than the diameter of the opening to define a ledge at the base of the flange. Locking hooks extend axially from the bottom land of the flange. Tangentially extending protrusions on the outer diameter of the flange terminate at radial catch surfaces. The tube and isolator combination fits inside the flange with the O-ring resting on the ledge to seal against fluid leakage.

A retainer has a cylindrical skirt that fits between the flange and the isolator. The interior surface of the skirt has a plurality of ribs which contact the isolator and space the isolator from the remainder of the skirt. The exterior surface of the skirt has a pair of lugs bounded by fingers. The lugs are axially located such that upon insertion and twisting of the retainer in the flange, the lugs are trapped underneath the hooks of the flange and, at the same time, the fingers engage the catch surfaces on the outside diameter of the flange. Engagement of the lugs and hooks prevents axial movement of the retainer while engagement of the fingers and catch surfaces prevents rotational movement of the retainer. The top land of the skirt adjoins the bead of the thermal isolator to prevent pull out of the EGR tube. The dimensions and locations of the hooks and lugs are chosen such that the securement of the retainer does not require axial compression of the O-ring.

BRIEF DESCRIPTION OF THE DRAWINGS

FIG. 1 is a plan view of the connector assembly.

FIG. 2 is an end view of the connector assembly, as viewed from the bottom of FIG. 1.

FIG. 3 is a side elevation view of the EGR tube and thermal isolator.

FIG. 4 is a bottom end view of the flange which is part of the intake manifold.

FIG. 5 is a plan view of the flange.

FIG. 6 is a plan view of the retainer.

FIG. 7 is a bottom end view of the retainer.

DETAILED DESCRIPTION OF THE INVENTION

The EGR tube connector of the present invention is shown generally at 10 in FIGS., 1 and 2. A small portion of the intake manifold wall is indicated at 12, the remainder of the manifold being broken away. An opening 14 in the wall 12 provides access for the EGR cold side tube 16 and its associated thermal isolator 18. An annular flange 20 is integrally formed on the exterior of the intake manifold wall 12. The flange is coaxial with the opening 14 and has an inside diameter that is somewhat greater than the diameter of the opening 14. Accordingly, the wall 12 defines a ledge 22 at the base of the flange. An O-ring 24 rests against the ledge. The tube 16 and isolator 18 are held fixed in the flange 20 by a retainer 26. Locking means on the flange and retainer will be described below.

The intake manifold material used by some manufacturers is polyamide 66, available from E. I. dupont de Nemours Co. under its trademark Zytel®. The flange will, of course, be made of this same material. The O-ring is preferably a fluorocarbon rubber available from dupont under its trademark Viton®.

Details of the EGR tube 16 and the thermal isolator 18 are shown in FIG. 3. The tube 16 is typically a monowall tube having a 0.625 inch outer diameter and a 0.035 inch wall thickness. Preferably it is made of stainless steel, for example either type 409 or type 304, the former being more cost effective, the latter having greater resilience at high temperatures. Type 304 is preferred due to the tendency toward increasing working temperatures.

The isolator 18 has a cylindrical body 28 concentric with the tube 16 and spaced therefrom. An upset bead 30 is formed in the outside wall of the body and extends radially therefrom. The body terminates at one end at 32 but merges at its other end with a necked-down portion 34 which in turn merges with a sleeve portion 36. The sleeve fits snugly around the EGR tube remote from the tip 32 of the isolator to support the body spaced from the tube. The sleeve is welded or brazed to the tube. Preferably the isolator 18 is made of the same material as the tube 16.

The bead 30 cooperates with the flange wall and the ledge 22 to define a seal cavity. The O-ring seal 24 is disposed in this cavity. The cavity has a width greater than or equal to the width of the seal 24. The width in this context means the distance from ledge 22 to bead 30. The seal 24 fits in the cavity without being axially compressed. The circumference of the seal is compressed by the inside surface of the flange, but the seal is not significantly compressed by the ledge or bead. This results in longer service life for the seal.

FIGS. 4 and 5 illustrate details of the intake manifold flange 20. The flange has a generally cylindrical wall defining a bottom land 38. The inside edge of the bottom land is chamfered as at 40 which helps prevent damage to the O-ring upon insertion into the flange. Extending from the bottom land, on diametrically opposed sides of the flange are hooks 42. The hooks have an axially extending base 44 and a radially extending leg 46 defining an L-shaped cross-section as shown in FIG. 5.

On the outer surface of the flange are two tangentially extending protrusions 48 which terminate at radial catch surfaces 50. The protrusions merge gradually from the cylindrical portions of the flange wall. The bases 44 of the hooks 42 are at least partially formed on top of the protrusions. The catch surfaces 50 cooperate with fingers of the retainer to prevent rotational movement, as will be described below.

Looking now at FIGS. 6 and 7, the retainer 26 is shown. It has a cylindrical skirt 52 with a top land 54 at one end and two arcuate, radially-extending finger grips 56 at the other end. The outside diameter of the skirt is slightly smaller than the inside diameter of the flange 20 so that the retainer slips easily inside the flange. The inside diameter of the skirt is such that the bottom land 54 engages the bead 30 of the thermal isolator, when the retainer is installed over the isolator from the sleeve end.

The interior surface of the skirt, carries a plurality of ribs 58. The ribs are sized to receive the outside diameter of the thermal isolator's body portion 28 (the portion of the body to the bottom of the bead 30, as seen in FIG. 3). Thus, the ribs support the thermal isolator concentrically of the retainer and spaced from the interior surface of the retainer skirt. The exterior surface of the skirt carries a pair of lugs 60. Hook-shaped finders extend from one edge of the lugs. The fingers include upstanding members 62 and latch members 64.

The retainer is made of polyphenylene sulfide resin such as available from Phillips Petroleum under its trademark Ryton ®. It is molded in an amorphous state to allow for more flexibility in the locking fingers. Other materials could be used such as nylon 66, polyetherimide, polyphthalamide, poly(amide-imide) and polyimide, all of which have the necessary high temperature properties.

The connector is assembled as follows. The thermal isolator 18 is slipped over the end of the EGR tube 16 and brazed or welded in place. The O-ring seal 24 is pressed over the end 32 of the isolator body and toward but not necessarily against the bead 30. The retainer 26 is placed over the end of tube 16 opposite end 32 and advanced down the tube until the top land 54 of the skirt 52 engages the bead 30. Then the tube, isolator and retainer are inserted into the intake manifold flange 20 with the fingers of the retainer rotationally oriented such that they are out of alignment with the hooks 42. Insertion continues until the bottom of the lugs 60 contact the bottom land 38 of the flange 20. The dimensions of the flange and retainer and the location of the lugs are such that when the retainer is fully inserted, i.e., lugs 60 bear against the bottom land 38 of the flange 20, the top land 54 of the retainer will not have pushed the bead far enough into the flange to axially compress the O-ring. Thus, the O-ring 24 will be trapped in the cavity between the ledge 22 and the bead 30 but will not be compressed between those parts. In fact, as described above, one of the advantages of the present invention is that axial compression of the O-ring does not occur and is not required to assist in maintaining the connection.

Once the tube, isolator and retainer are fully inserted, the finger grips 56 are used to rotate the retainer. Rotation continues until the lugs 60 and fingers of the retainer engage the hooks 42 of the flange. As the retainer rotates, the latches 64 will engage the protrusions 48 of the flange and flex outwardly as they ramp up the outside surface of the protrusions. This continues until the upstanding members 62 of the fingers abut against the bases 44 of the hooks 42, preventing further rotation in one direction. Once contact between the bases 44 and upstanding members 62 is achieved, the latches 64 will snap over the catch surfaces 50 to engage therewith and prevent reverse rotation of the retainer. This is best seen in FIG. 2. Also, as the latching rotation takes place the lugs 60 slide into place between the legs 46 and bottom land 38 of the flange, thereby preventing any axial movement of the retainer. Since the retainer traps the bead 30, pullout of the EGR tube is prevented.

It can be seen that the connector of the present invention protects the recently developed polymeric intake manifold from heat generated by the recirculated exhaust gasses. The thermal isolator provides protection from conductive, convective and radiative heat transfer to the retainer, and provides a means of tube retention. The retainer provides a locking means, a bearing surface for EGR tube stability, and thermal protection for the intake manifold. The O-ring seal prevents escape of gasses and does not have its service life shortened by being unduly stressed. The quick connect design allows installation in minimum time and with no special tools.

Whereas a preferred form of the invention has been shown and described, it will be realized that modification may be made thereto without departing from the scope of the following claims.

I claim:

1. A connector for attaching an EGR tube to an intake manifold of an internal combustion engine, comprising:

a flange surrounding an opening formed in the intake manifold, the flange having hook means formed thereon;

a thermal isolator surrounding an end of the tube and having a sleeve contacting the outer surface of the tube remote from said end, and a cylindrical body portion joined to the sleeve and spaced from the tube, the tube and thermal isolator being insertable into the flange such that the tube is in fluid communication with said opening;

a retainer insertable into the flange and having lug means for engaging the hook means of the flange to prevent removal of the retainer from the flange, the retainer having a bearing surface for supporting the body portion of the thermal isolator in the retainer and means for engaging the thermal isolator to prevent removal of the thermal isolator from the flange; and seal means for sealing the flange and thermal isolator against fluid leakage.

2. The connector of claim 1 wherein the retainer comprises a cylindrical skirt and the bearing surface comprises a plurality of ribs projecting inwardly from the skirt.

3. The connector of claim 2 wherein the ribs extend axially along the skirt.

4. The connector of claim 1 further comprising finger grips extending axially from the retainer.

5. The connector of claim 1 wherein the flange is generally cylindrical and has an inside diameter greater than that of the opening such that the intake manifold interior of the flange defines a ledge.

6. The connector of claim 5 wherein the body portion of the thermal isolator includes a radially-extending bead spaced from the ledge when the isolator is fully inserted into the flange to define a cavity which receives the seal means.

7. The connector of claim 6 wherein the cavity and seal means are sized such that the seal means are not compressed axially.

8. The connector of claim 1 further comprising interlocking anti-rotation means on the flange and retainer which are engageable upon insertion and twisting of the retainer.

9. The connector claim 8 wherein the anti-rotation means includes a protrusion and catch surface formed on the flange and a latch member on the retainer, engageable with the catch surface.

10. A connector for attaching the end of an EGR tube to a flange surrounding an opening in the wall of an intake manifold of an internal combustion engine, comprising:

a thermal isolator having a cylindrical body and support means in contact with the tube for locating the body spaced from the tube near said end thereof;

a bead formed on the body intermediate the ends thereof, extending radially therefrom, the tube and thermal isolator being insertable into the flange such that the tube is in fluid communication with said opening, and the bead, flange and intake manifold wall define a seal cavity;

seal means disposed in the seal cavity for sealing the flange and thermal isolator against fluid leakage, the seal cavity being sized so as not to compress the seal means between the bead and intake manifold wall; and a retainer insertable into the flange and having latching means for engaging the flange to prevent removal of the retainer from the flange, the retainer having means for engaging the bead to prevent removal of the thermal isolator from the flange.

* * * * *